June 23, 1942.  T. G. NYBORG  2,287,357
LUBRICATION OF CONVEYER ROLLERS
Filed March 15, 1940
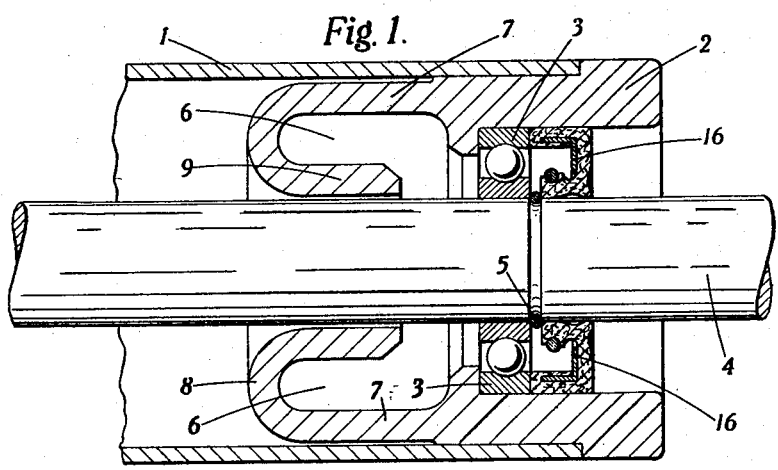
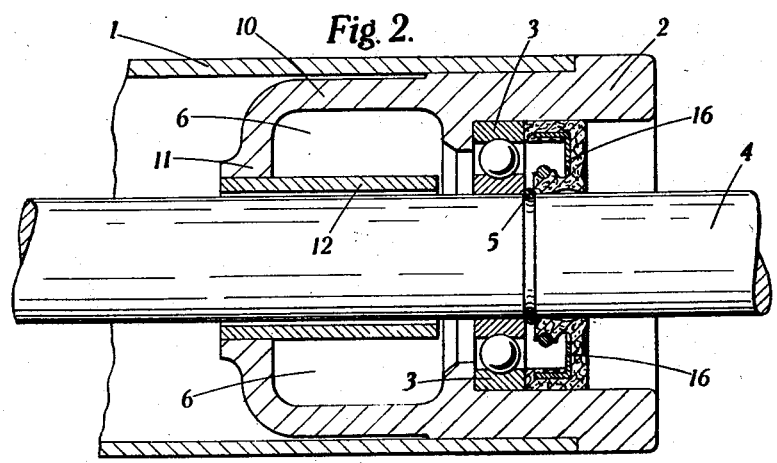
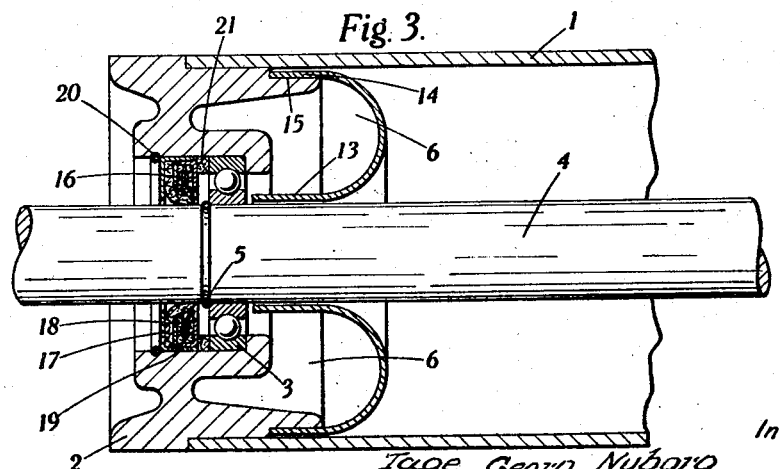
Inventor
Tage Georg Nyborg
by
Attorney Patented June 23, 1942

2,287,357

UNITED STATES PATENT OFFICE 2,287,357

LUBRICATION OF CONVEYER ROLLERS

Tage Georg Nyborg, Worcester, England, assignor of one-half to The Mining Engineering Company Limited, Worcester, England Application March 15, 1940, Serial No. 324,199
In Great Britain March 18, 1939

4 Claims. (Cl. 308—187)

This invention relates to rollers supported by bearings near their ends and more especially to rollers for conveyer belts.

It is known to use oil lubrication in such rollers, the oil being generally contained in the shell forming the outer casing of the roller or in an inner tube round the spindle connecting the two end rings in which the bearings are housed. In these arrangements, if the roller is running appreciably off the level, as frequently occurs in conveyers used for mining practice, or in the inclined rollers of troughed idlers, the oil tends to run to one end of the roller and to starve the upper bearing.

The object of the present invention is to provide an oil lubricated roller in which the oil is maintained in close proximity to the bearings at each end of the roller irrespective of the angle to which the roller is tilted.

In an oil lubricated roller in accordance with the invention, the oil is retained in close proximity to the bearings at each end by the provision of an oil chamber of such a shape that the quantity of oil retained in it, irrespective of the angle to which the roller is tilted, is sufficient to flood the bearing when the roller is in approximately its designed running position.

A further feature of the design is that the annular space between the spindle and shell in the body of the roller may be used as a lubricant reservoir from which the chambers associated with the end rings may be replenished simply by upending the roller each way in turn and permitting the lubricant to flow through the annular clearance space between the spindle and the outward directed portion of the chamber wall.

Some specific forms of which the new or improved features, combinations or arrangements of parts form in themselves parts of the invention will now be described in some detail with reference to the accompanying drawing in which:

Fig. 1 represents a cross-section through one end of one form of improved roller, Fig. 2 represents a similar view of another form, and Fig. 3 represents a similar view of yet another form.

In the forms illustrated, the roller comprises a sleeve 1 supported by end rings 2 which are mounted on ball bearings 3 on a spindle 4, all the parts being locked together by spring ring abutments 5 on the spindle. The end rings 2 and the associated means for retaining the oil in close proximity thereto are similar at each end of the roller so that a description of the arrangement at one end should suffice.

At the back of the end ring 2 carrying the bearing 3 there is provided for the lubricant, an annular chamber 6 enclosed by cylindrical walls parallel to the axis of the spindle. The annular chamber is defined at the outer end by the bearing and the end ring and its other end is closed.

In the form shown in Fig. 1, the chamber 6 is formed integrally with the end ring as by casting. The end ring 2 is extended inwardly to provide a cylindrical wall 7 which merges by an annular end portion 8 into a reversely projecting inner cylindrical portion 9. This inner cylinder 9 encircles the spindle 4 fairly closely without however contacting therewith.

In the form shown in Fig. 2, the chamber is formed between an extension of the end ring comprising a cylindrical portion 10 turned inwardly to form an annular flange 11 into which is fitted (as by pressing) a tube 12, encircling the spindle 4 and projecting towards the bearing 3.

In the form shown in Fig. 3, the chamber 6 is formed by a member of annular dished form having inner and outer cylindrical walls 13, 14 coaxial with the spindle axis, which are connected to one another so as to form an annular channel of rounded U-section with the limbs (13, 14) of the U parallel to the axis of the spindle 4.

The outer cylindrical wall 14 of this member engages the outer periphery of the end ring 2 which is cut away at 15 for this purpose and the inner cylindrical wall 13 surrounds the spindle in such a manner as to be rotatable relatively thereto.

Oil sealing means 16 are provided outside the bearing 3 so that a chamber is formed by the end ring 2, the member defining the annular chamber 6 and the oil sealing means 16. The arrangement is such that this chamber can retain a sufficient quantity of oil to flood the bearing when the roller is running irrespective of tilting of the roller to any normal angle.

The oil sealing means may comprise any suitable seal of known type. As shown in Fig. 3, a leather washer 17 in a housing 18 is pressed by a coil or plate spring 19 against the spindle 4, the housing 18 fitting within a recess in the end ring. The housing 18 is retained in position by a spring ring 20 in the end ring. Another suitable known type comprises a seal of synthetic rubber.

Preferably additional sealing means is provided on the outer diameter of the bearing bore in the end ring between the housing of the oil sealing means 16 and the outer race of the bearing 3. This additional sealing means may, as shown in Fig. 3, comprise a washer 21 of leather or like material pressed against the bearing race by the spring ring 20 in the end ring which retains the sealing means 16 in position. When a synthetic rubber seal is used, this may have a lip which presses into oil tight contact with the outer bearing race.

The oil sealing means is removable for refilling the oil chamber.

I claim:

1. A conveyer or like roller having a shell and end rings, bearings mounted in said end rings, a spindle surrounded by said bearings, the space between the shell and spindle providing an oil reservoir, oil sealing means outside the said bearings, and annular oil-retaining chambers rotatable relatively to the said spindle and with the shell and end rings and located in the space between the shell and the spindle, said chambers having re-entrant portions adjacent to the spindle to establish restricted communication with the oil reservoir and terminating short of the bearings but of sufficient length to form a reservoir of definite oil-retaining capacity at any tilt of the roller to retain enough lubricant to supply the adjacent bearing when the roller is running in its horizontal or slightly inclined running position.

2. A bearing lubricating means, including two relatively rotatable concentric elements spaced apart to provide an oil reservoir between them, anti-friction bearings between and at the respective ends of the elements, an enlarged chamber carried by the outer element inwardly of and adjacent each bearing, each chamber being formed with a relatively deep recess opening only toward the adjacent bearing with an inner wall providing with the inner member restricted communication with the reservoir.

3. A construction as defined in claim 1, wherein the chamber is formed in two parts, one being a tube concentric with and slightly spaced from the inner element.

4. A construction as defined in claim 1, wherein the chamber is made in two parts, one carried by the outer element and the other of U-form, with one wall in spaced narrow concentric relation to the inner element.

TAGE GEORG NYBORG.